United States Patent [19]
Nilsson et al.

[11] Patent Number: 4,589,793
[45] Date of Patent: May 20, 1986

[54] MOUNTING ARRANGEMENT

[76] Inventors: Erik W. Nilsson, Åsbovägen 1; Åke Brunnegard, Furuvägen 10; Hans Ring, Furuvägen 14, all of S-513 00 Fristad, Sweden

[21] Appl. No.: 614,663

[22] Filed: May 29, 1984

[30] Foreign Application Priority Data

Jun. 9, 1983 [AT] Austria .................. 2105/83

[51] Int. Cl.⁴ .................. B25G 3/28; F16B 3/04
[52] U.S. Cl. .................. 403/13; 403/355; 403/361; 403/377
[58] Field of Search .................. 403/13, 14, 361, 375, 403/377, 362, 355, 319, 316; 411/353, 352; 248/510, 507, 508

[56] References Cited

U.S. PATENT DOCUMENTS

| | | | |
|---|---|---|---|
| 351,425 | 10/1886 | Coleman | 403/355 |
| 1,982,011 | 11/1934 | Michel | 403/24 |
| 2,219,385 | 10/1940 | Ernst | 403/361 |
| 2,895,754 | 7/1959 | Wurzel | 403/355 |
| 3,012,799 | 12/1961 | Mayne | 403/377 |
| 3,797,949 | 3/1974 | Petros | 403/355 |

Primary Examiner—Cornelius J. Husar
Assistant Examiner—Peter M. Cuomo
Attorney, Agent, or Firm—Browdy and Neimark

[57] ABSTRACT

An arrangement for firmly mounting a body in an aperture located in a planar surface on a platen comprises a mounting plate which is inserted in a groove located on the perimeter of the body. Means are provided for urging a part of the plate projecting from the groove into abutment with the planar surface and holding the projecting plate part thereagainst.

The planar surface and the opposing surface of the mounting plate form an acute angle therebetween prior to urging the projecting portion into abutment with the planar surface. The value of this acute angle is selected in respect of given parameters, so as to pre-stress the mounting plate when the projection is urged against the planar surface.

12 Claims, 13 Drawing Figures

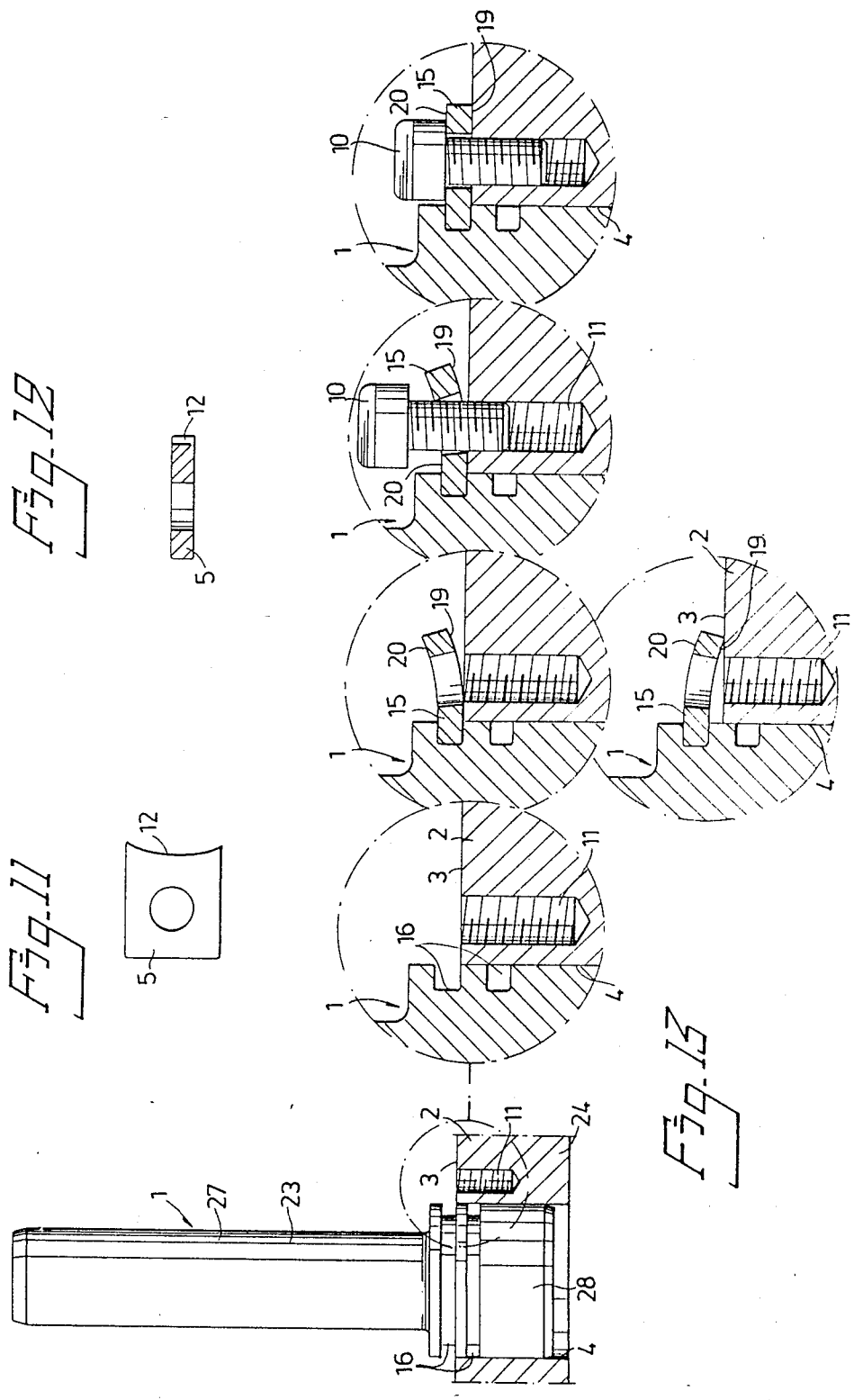

MOUNTING ARRANGEMENT

The present invention relates to an arrangement for firmly mounting a body in an aperture located in a planar surface on a platen. Examples of such bodies include pillars and bushes on mechanical machines, such as punches, and presses for example.

Earlier known mounting arrangements for a pillar and associated bush include mounting flanges on the attachment portion of the pillar and on the bush. Such pillars and bushes are primarily used in connection with mechanical presses and punches of the kind which include an upper and a lower table on which the press and/or punch devices are mounted. These devices include an upper and a lower platen, on which respective tool halves, such as punches and dies, are mounted, together with pillars and bushes operative in guiding the relative movement of the two tool halves. Each such press or punch requires at least two pairs of pillars and bushes for guiding the movement of the platens. It is essential that the outer slide face of the pillar and the inner face of the bush are precisely parallel with one another, and that corresponding assembly bores in the upper and lower platens have mutually the same centre-to-centre distance therebetween and are accurately aligned, one with the other. If this is not so, the pillar will be subjected to large bending stresses and there will be a high degree of wear on the pillar and on the bush. More seriously, the pillar may jam or bind in the bush, thereby preventing the punch or press from making a full working stroke. Wear on the pillars and bushes, together with bending stresses on the pillars and possible distorsion of said pillars, will in time impair the guiding function thereof, and therewith the dimensional accuracy of the workpieces produced by the press or punch.

There are used today pillar and bush combinations in which the various pillars and bushes have different external diameters. This means that the holes located in the upper and lower platens must also have differing diameters, and must therefore be made in separate working operations. This demands extremely high precision on the part of the manufacturer, in ensuring that the holes in the upper and lower platens have mutually the same centre-to-centre distance. Consequently, the use of such pillars and bushes means that each of the upper and lower platens must be machined separately, that the platens must be set-up extremely accurately when machining the bores, and that it is necessary to use a large array of tools of differing dimensions when manufacturing said platens, all of which greatly extends the time required to effect said manufacture.

The thickness of the platens on which the press and/or punch tools are mounted varies according to the magnitude of the press forces to which the platens are subjected, and/or the dimensions of the end product. The pillar length may also vary in accordance with the required length of stroke and with the distance between the platens at the beginning and the end of a working operation.

Consequently, in order to satisfy consumer demands for pillars and bushes adapted for differing platen thicknesses, platen-distances and lengths of stroke, the manufacturer and distributor must produce and stock a large assortment of pillars and bushes of mutually different lengths.

Consequently, an object of the invention is to provide a pillar and bush mounting arrangement which will firstly enable pillars and bushes of mutually the same dimensions to be used, secondly enable bores to be made simultaneously in both the upper and the lower platen in a single working operation, thirdly shorten the time taken in tool manufacture, and fourthly will reduce the number of tool sizes required to manufacture the aforesaid press and/or punch devices. A further object of the invention is to provide pillars and/or bushes which can be used for more than one plane thickness and/or platen-distance and length of stroke respectively.

Accordingly, this invention consists in an arrangement for firmly mounting a body in an aperture located in a planar surface on a platen, said arrangement comprising a projection extending outwardly from said body, and fastener means for urging said projection into abutment with said planar surface when said body is located in said aperture, wherein said body has at least one groove in a least a part of its perimeter; wherein said projection comprises a projecting portion of a mounting plate inserted in said groove; and wherein said planar surface and the surface of said mounting plate opposing said planar surface form an acute angle therebetween, prior to urging said projecting portion into abutment with said planar surface.

Two different solutions to the problem are suggested, both of which, however, are based on the same fundamental principles.

A first solution involves the use of a planar mounting plate arranged to be fitted into a groove in a body inserted in a bore in a platen, said groove forming an angle with a planar surface on said platen. Subsequent to inserting the mounting plate in the groove, the plate is tightened by means of a bolt located in a hole intended therefor in the second body.

When the mounting plate is tightened into flat abutment with the fixed surface, the plate will bend within the groove, thereby to obtain an abutment line along one of the outer defining edges of the groove, and a further abutment line along which the outer edge of the plate lies against the opposite side of the groove. Bending of the plate is at least partially in the form of an elastic deformation, and thus when the plate strives to return to its original state, it will be urged against the side of the groove and the opposing outer edge thereof, such as to secure the body against axial movement in said bore.

The angle at which the groove is inclined is suitably at most 10°, and preferably 3°–5° to the surface plane of the aforementioned surface. When seen in relation to the planar surface, the play between the mounting plate and the groove is less than the difference in height between an outer edge of the groove and the inner abutment line of the mounting plate on the same side of the groove as said edge.

In accordance with another embodiment of the invention, the groove is parallel with the aforesaid planar surface and the mounting plate has a curved configuration, for example a conical or at least partially cylindrical shape, or alternatively an irregular curved shape. The mounting plate can only be inserted into the groove, when said plate is located at an angle to the aforesaid planar surface. The mounting plate is then screwed into substantially parallel abutment with said planar surface, whereupon it is distorted in the groove to a different curved shape. The mounting plate of this embodiment is also pre-tensioned in the groove, with one abutment line extending along one of the outer defining edges of the groove and another abutment line along which the outer edge of the plate lies on the opposite side of the groove.

In certain cases, however, this solution can cause several problems. For example, in certain plate designs, such as a conical design, it is possible to over-tighten the plate extent such as to deform said plate quite considerably, such that the plate solely abuts one side of the groove. In the case of some plate designs, it is also possible to insert the plate with the curved surface in one of a number of different positions, such that some plates become curved upwardly and others downwardly. As will become evident from the description made hereinafter with reference to the drawings, this means that some plates will lie against the upper edge of the groove, and others against the lower edge thereof. In such cases, the plates will endeavour to position the aforesaid body obliquely in its respective bore, the extent to which the body is moved out of true being dependent upon the amount of play in said bore. This problems can be overcome, however, by providing the mounting plates with a respective selected curved form, and by also providing the plates with means which indicate the direction in which the plates shall be inserted into said groove, so that all plates will face in the intended direction, and which preferably makes it impossible to insert an incorrectly oriented plate. Such a position indicator may comprise an upwardly turned edge on corner on the mounting plate.

When the invention is employed with a pillar and an associated bush, particular advantage is afforded when at least either the pillar or the bush is provided with more than one mounting groove. The pillar and/or bush should also have mutually the same external diameter on both sides of the groove. It is also an advantage when at least one of the grooves on a bush is assymmetrically positioned, thereby providing several alternative bush heights above the aforesaid planar surface, by reversing the bush.

The invention will now be described in more detail with reference to the accompanying drawings, in which FIGS. 1 and 2 illustrate an embodiment of a planar mounting plate in an unloaded state;

FIG. 11 is a horizontal view of a planar mounting plate;

FIG. 12 is a cut-away sectional view of the plate shown in FIG. 11, and

FIG. 13 is an assembly drawing, illustrating the procedures taken when mounting a pillar and a curved mounting plate.

FIGS. 1–8 are enlarged detail views of grooves having mounting plates of differing conceivable shapes inserted therein, said plates being shown in an unloaded state and a state in which they are screwed firmly down, and in different positions of orientation. For the sake of clarity, the inclination of the grooves, the curvature of the plates and the clearances or play between plate and groove have been greatly exaggerated in comparison with those values suitable for use in practical applications of the invention.

Figure 1:
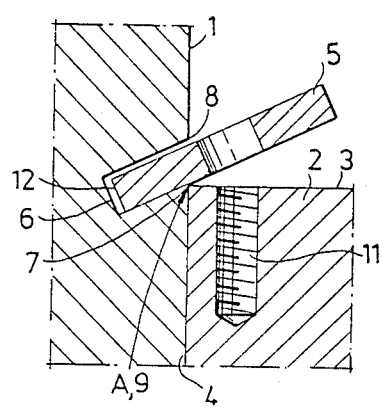

FIG. 1 illustrates a body 1 which is inserted in a bore 4 located in a planar surface 3 of a platen 2. A planar plate 5 is inserted in an inclined groove 6. The groove is defined at a location thereon adjacent the planar surface 3 by an acutely angled edge portion 7, and at a location remote from said planar surface by an obtusely angled defining edge portion 8. The abutment surface A with which the mounting plate 5 abuts the surface 3 is comprised of the edge 9 defining the bore 4.

Figure 2:
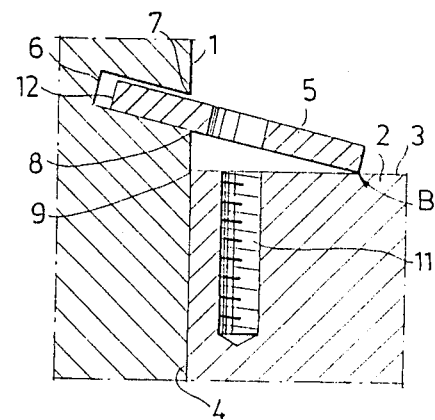

FIG. 2 illustrated in a corresponding manner how a planar plate 5 is fitted into an inclined groove 6, the obtuse edge angle 8 of which is located adjacent the planar surface 3. In this case, the plate 5 obtains an abutment surface B which is located at a distance from the defining edge 9.

Figure 3:
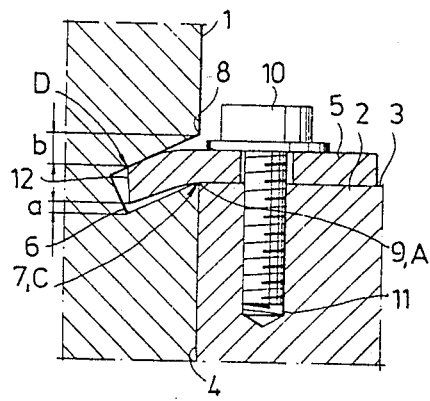
FIGS. 3 and 4 illustrate the embodiment of FIGS. 1 and 2 with the plate screwed firmly down.

FIG. 3 illustrates the arrangement shown in FIG. 1 subsequent to mounting a mounting bolt 10 in hole 11 intended herefor. In this case, the mounting plate 5 obtains an abutment line C at the defining edge of the groove and a further abutment line D on the opposite side of said groove. The abutment edge C is located at the groove edge forming an acute angle 7. The mounting plate 5 is pretensioned in the groove 6, which requires the clearance "a" between the plate 5 and the groove 6 to be smaller than the difference in height "b", relative the planar surface 3 between the outer defining edge 8 of the groove and the inner abutment point D of the mounting plate on the same side of the groove. It will also be seen that the groove edge containing the acute edge angle 7 coincides exactly with the surface plane of the surface 3.

Figure 4:
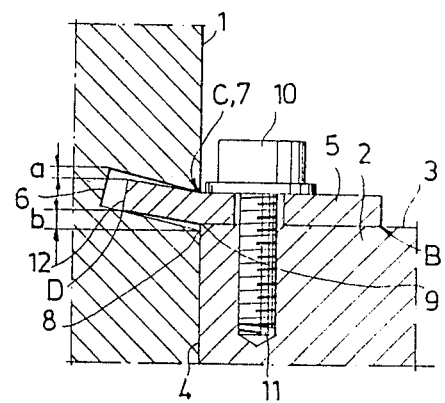

Correspondingly, FIG. 4 illustrates the mounting arrangement of FIG. 2 subsequent to having inserted the bolt 10 in the hole 11. In this embodiment, the abutment line C at the location of the acutely angled defining edge 7 is on the side of the plate 5 remote form the planar surface 3. The clearance "a" between the plate 5 and the groove 6 is also in this case required to be smaller than the height difference "b", as seen in relation to the planar surface 3, between the outer groove-defining surface 3 and the inner abutment location D of the mounting plate 5 on the same side of the groove. As will be seen from the Figure, the obtusely angled defining edge 8 of the groove is in this case located beneath the horizontal plane of the surface 3. The axial position of the body 1 in the bore 4 is determined by the upper surface of the mounting plate 5 and the acutely angled defining edge 7. When a multiplicity of mounting plates of differing thicknesses are used, the thickest plate will determine the axial position of the body 1. The obtusely angled groove edge 8 is located beneath the plane of the surface 3 at a distance which is at least approximately equal to the clearance "a".

As will be understood from the aforegoing, the acutely angled groove edge 7 will always be that which determines the position of the body 1.

Figure 5:
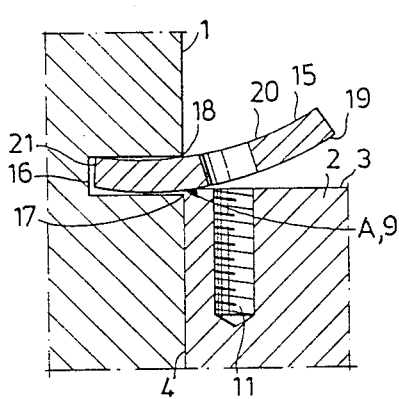
FIGS. 5 and 6 are detail views of a curved mounting plate in an unloaded state.

FIG. 5 illustrates a further embodiment of the invention, in which a curved mounting plate 15 is inserted in a straight groove 16, having a lower defining edge 17 located adjacent the planar surface 3, and an upper defining edge 18 located at a distance from said surface. The convex side 19 of the plate 15 is turned towards the surface 3, and the abutment edge A is located at the defining edge of the bore 4.

Figure 6:
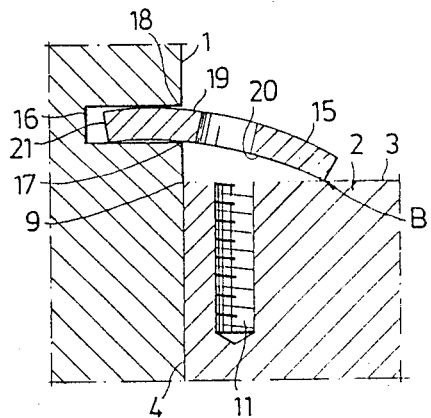

Correspondingly, FIG. 6 illustrates how the curved plate 15 is inserted into the groove with the concave side 19 of said plate facing the surface 3. The mounting-plate abutment line B with the surface 3 will then be located at a distance from the defining edge 9.

Figure 7:
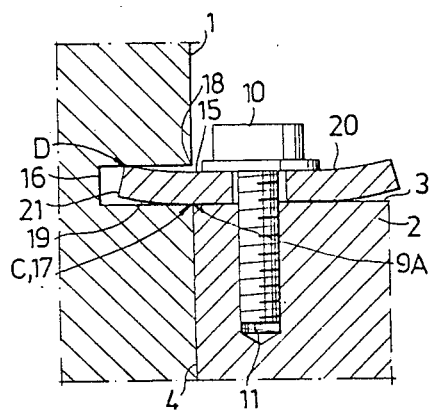
FIGS. 7 and 8 illustrate the embodiments of FIGS. 5 and 6 with the plate screwed firmly down.

FIG. 7 illustrates a mounting arrangement according to FIG. 5 in which a mounting bolt 10 has been screwed into its intended hole. The mounting plate is thus pretensioned in the groove 16, exhibiting an abutment line C along the lower defining edge 17 of the groove 16 and a further abutment line D, where the outer edge 21 of the plate lies against the opposite side of the groove 16. The lower defining edge 17 is located on a level with the defining edge 9 of said bore.

Figure 8:
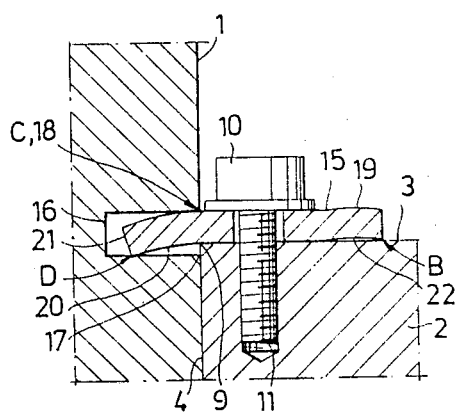

Correspondingly, FIG. 8 illustrates the mounting arrangement according to FIG. 6, with the mounting bolt 10 inserted, in which arrangement the mounting plate 15 is pretensioned in the groove 16, with an abutment line 7 along the upper defining edge 18 of the groove and a further abutment line D where the outer edge 21 of the plate lies against the opposite side of the groove 16. In this case, the lower defining edge 17 of the groove is located beneath the planar surface 3. Optionally, the plate 15 on the side of the bolt 10 remote from the body 1 may have a residual curved form, exhibiting a cavity 22 between the plate and the surface 3.

In an arrangement according to the invention which includes a curved plate, the convex side of the plate will determine the axial position of the body 1. When the convex side faces the surface 3, said surface will lie flush with the lower defining edge 17 of the groove. When the concave side 20 faces the surface 3, the upper defining edge 18 of the groove will be located at a distance from the surface 3 corresponding to the thickness of the plate 15. In the case of the plates of differing thicknesses, the thickest plate will determine the position of said body.

The embodiments illustrated in FIGS. 5-8 relate substantially to a plate of cylindrical form, although plates of other curved configurations are conceivable. In this latter case, the holding conditions may be more complicated, and in the case of certain forms of curved plates it may be necessary to tighten the bolt 10 with the aid of a torque wrench, so as not to excessively tighten the plate and so as to leave a gap.

Figures 9, 10:
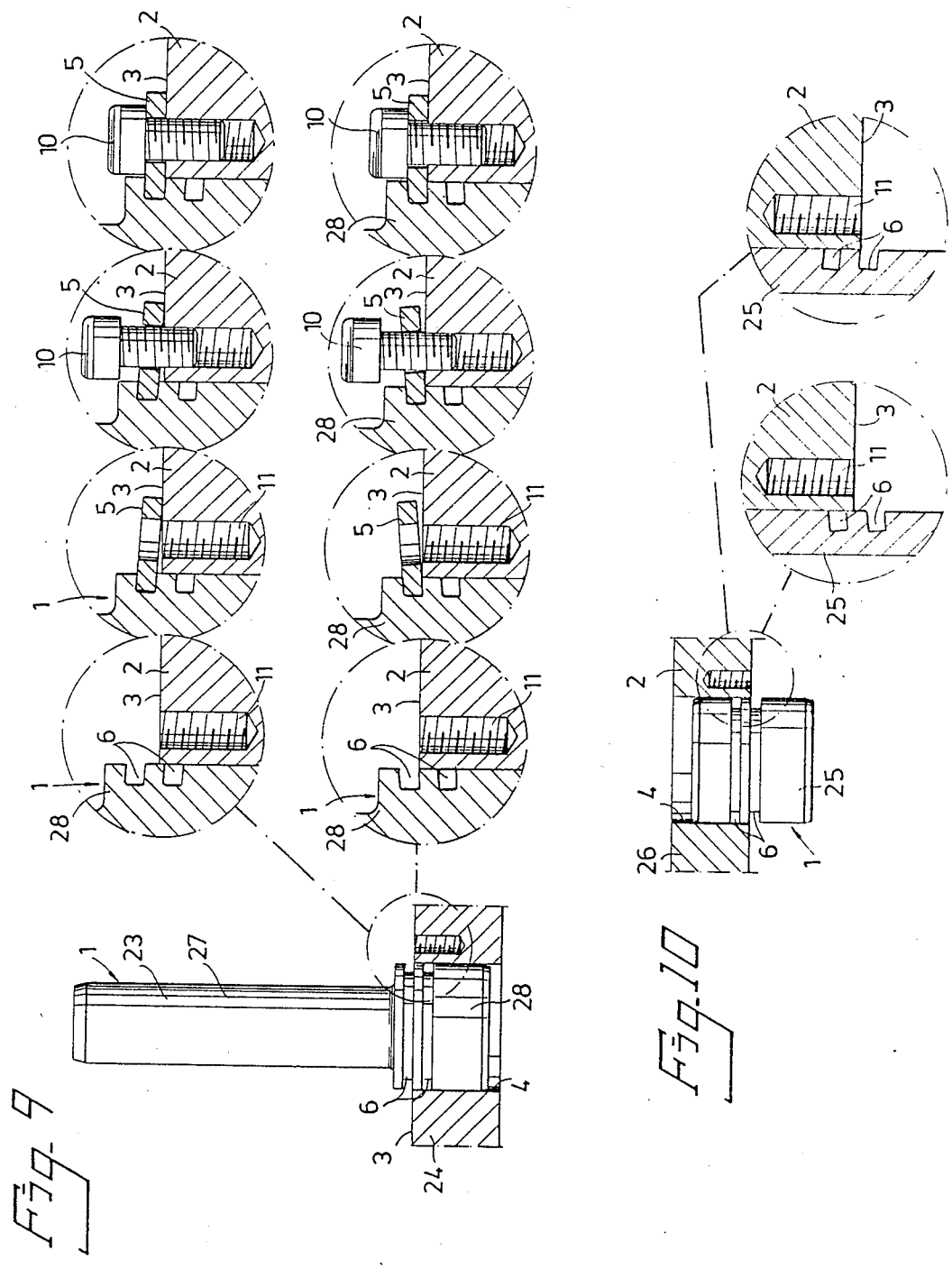
FIG. 9 is an assembly drawing illustrating the procedure taken when mounting a planar mounting plate and a pillar.
FIG. 10 illustrates various mounting alternatives in the case of a bush having grooves for a planar mounting plate.

FIG. 9 illustrates an embodiment in which the body 1 comprises a pillar 23 and the platen 2 is a lower platen 24 of a mechanical press and/or punch. The pillar 23 is provided with two inclined grooves 6. The upper line of enlarged views in FIG. 9 illustrate the mounting procedure, step by step, in the case of an upwardly inclined groove, while the lower line illustrates the mounting procedure in the case of a downwardly inclined groove.

FIG. 10 illustrates a body 1 in the form of a bush 25 associated with the pillar 23, said pillar being fitted to a platen 2, for example the upper platen 26 of a mechanical press and/or punch. The upper enlarged detail view illustrates an oblique groove 6 which slopes in beneath the planar surface 3 of the platen, while the lower detail view illustrates an oblique groove which slopes up above said surface.

FIGS. 11 and 12 are a horizontal view and a cross-sectional view respectively of a mounting plate 5. As illustrated, the outer edge 12 of the mounting plate is of arcuate shape and is thus able to follow the bottom contour of a groove 6 in a cylindrical body 1.

FIG. 13 illustrates in a manner corresponding to FIG. 11 how a pillar 23 is mounted onto a lower platen 24 with the aid of a curved mounting plate 15 inserted into one of two straight grooves 16. In the embodiment shown in FIGS. 11 and 13 the diameter of the upper part 27 of the pillar is smaller than the mounting part 28 thereof, which enables the use of a bush 25 having the same external diameter as the mounting part 28. This enables fulfillment of the aforementioned desideratum of being able to mechanically machine the upper and lower platens simultaneously, such as to obtain precisely the same centre-to-centre distances between the bores in the upper and the lower platen, and to obtain bores 4 of exactly the same size.

In order to provide good guidance, and primarily good guidance of the pillar, the measuring tolerance between the mounting portion 28 of the pillar and the bore 4 shall be extremely accurate. In order to prevent misalignment due to the mounting plates, which as will be understood from the aforegoing may occur when the thickest plate determines the axial position, the mounting plates should be machined so that all plate have the same thickness.

The illustrated embodiments are not intended to limit the scope of the invention, and modifications can be made without departing from the concept of the invention within the scope of the following claims. It will be understood that although one mounting plate may suffice, there are normally used a plurality of such plates, often three or four.

What is claimed is:

1. An arrangement for securely mounting a body in a bore carried by a platen, the platen including a planar surface extending outwardly about the bore, and the body having a peripheral groove, the arrangement comprising:
   a mounting plate having a first portion inserted in said groove and a second portion extending outwardly from said groove and overlying said planar surface, said second portion including an aperture, and
   means, extending through said aperture and into engagement with said planar surface, for urging said second portion into abutment with said planar surface,
   said planar surface and the surface of said mounting plate opposing said planar surface forming an acute angle therebetween so that upon urging said second portion into abutment with said planar surface, said first portion is tensioned within said groove.

2. An arrangement according to claim 1, wherein said angle is so selected in relation to the width of said groove and the thickness and shape of said mounting plate, that the mounting plate is pre-stressed when said second portion is urged into abutment with said surface.

3. An arrangement according to claim 2, wherein said mounting plate, when urged into abutment with said planar surface, has an abutment line along one of the groove-defining edges and a further abutment line where a plate-defining edge remote from the second portion of said plate lies against the opposite side of the groove.

4. An arrangement according to claim 3, wherein said groove is inclined in relation to said planar surface at an angle of at most 10°, and wherein said mounting plate is planar.

5. An arrangement according to claim 4, wherein said angle is 3°-5°.

6. An arrangement according to claim 3, wherein said mounting plate and said groove exhibit therebetween a clearance which, when seen relative to the planar surface, is smaller than the difference in height between an outer defining edge of the groove and said inner abutment line of the mounting plate on the same side of said groove.

7. An arrangement according to claim 4, the groove in said body is inclined inwardly below said planar surface, when said body is mounted in said platen.

8. An arrangement according to claim 2, wherein said groove extends parallel with said planar surface, and wherein said mounting plate has a curved configuration, such as to be pre-stressed in the groove when said second portion is urged into abutment with said planar surface.

9. An arrangement according to claim 8, comprising a plurality of mounting plates of curved configuration, wherein each of said plates has arranged on one side thereof a position indicator intended to show the correct position of the plate in its respective groove, and to prevent wrong positioning of said plates.

10. An arrangement according to claim 3, wherein the mounting plate is formed so that said defining edge thereof conforms with the shape of the bottom contour of said groove.

11. An arrangement according to claim 1, wherein said bore is cylindrical, and wherein said body has at least a part which is of similar cylindrical shape to said bore and provided with said at least one groove.

12. An arrangement according to claim 11, wherein said body is a pillar or a bush associated therewith and has the same external diameter as said body-mounting portion.

* * * * *